(12) United States Patent
Dei et al.

(10) Patent No.: US 7,653,251 B2
(45) Date of Patent: Jan. 26, 2010

(54) METHOD, APPARATUS, SYSTEM, AND PROGRAM FOR SWITCHING IMAGE CODED DATA

(75) Inventors: Hiroaki Dei, Tokyo (JP); Kazuhiro Koyama, Tokyo (JP); Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 713 days.

(21) Appl. No.: 11/208,886

(22) Filed: Aug. 23, 2005

(65) Prior Publication Data

US 2006/0045363 A1 Mar. 2, 2006

(30) Foreign Application Priority Data

Aug. 25, 2004 (JP) .............................. 2004-245732

(51) Int. Cl.
*G06K 9/36* (2006.01)
(52) U.S. Cl. .................................................... 382/232
(58) Field of Classification Search ......... 382/232–233, 382/236, 238–240, 244–253; 348/426.01–426.08; 358/384.1, 387.1, 390.1, 394.1–395.1, 400.1–404.1, 358/407.1–416.1, 420.1–421.1, 430.1–431.1; 375/240.02–240.08, 240.11–240.26
See application file for complete search history.

(56) References Cited

U.S. PATENT DOCUMENTS

| | | | |
|---|---|---|---|
| 5,831,688 A | | 11/1998 | Yamada et al. |
| 6,072,830 A | * | 6/2000 | Proctor et al. ........... 375/240.22 |
| 6,680,976 B1 | * | 1/2004 | Chen et al. ............. 375/240.26 |
| 7,164,714 B2 | | 1/2007 | Martin |
| 7,283,589 B2 | * | 10/2007 | Cai et al. ............... 375/240.26 |

(Continued)

FOREIGN PATENT DOCUMENTS

EP  1 233 614 A1  8/2002

(Continued)

OTHER PUBLICATIONS

Handley, M., et al., "SDP: Session Description Protocol", RFC 2327, pp. 1-30 (Apr. 1998).

(Continued)

*Primary Examiner*—Jose L Couso
(74) *Attorney, Agent, or Firm*—Foley & Lardner LLP

(57) ABSTRACT

A conversion server and a plurality of clients are connected via a transmission line. The conversion server that receives image coded data from the clients converts the image coding system in accordance with the coding system available to each client, the coding setting, and the status of the transmission line, and transmits the converted image coded data. For a client where the number of images that can be displayed is limited, the conversion server decodes a selected plurality items of image coded data, re-encodes the selected pieces into one composite image, and transmits the re-encoded image. The conversion server also comprises decoding processing units, one for each connected client, for decoding image coded data from each client. In response to a display image switching request from a client, the conversion server intraframe-codes the decoded image data of an image that will be used after the switching and transmits the intraframe-coded data. This enables an image to be switched quickly independently of the intraframe time of received image coded data that will be used after the switching.

51 Claims, 8 Drawing Sheets

U.S. PATENT DOCUMENTS

| | | |
|---|---|---|
| 2002/0147980 A1 | 10/2002 | Satoda |
| 2004/0008249 A1 | 1/2004 | Nelson et al. |
| 2004/0034864 A1 | 2/2004 | Barrett et al. |

FOREIGN PATENT DOCUMENTS

| | | |
|---|---|---|
| GB | 2 384 932 A | 8/2003 |
| JP | 6-266882 | 9/1994 |
| KR | 1996-0016582 | 5/1996 |
| KR | 1999-0084260 | 12/1999 |

OTHER PUBLICATIONS

Handley, M., et al., "SIP: Session Initiation Protocol", RFC 2543, pp. 1-108 (Mar. 1999).

Schulzrinne, H., "RTP: A Transport Protocol for Real-Time Applications", RFC 1889, pp. 1-53 (Jan. 1996).

M. H. Willebeek-Lemair et al., "On Multipoint Control Units for Videoconferencing," Proceedings of the Conference on Local Computer Networks, Oct. 2, 1994, XP000198030, pp. 356-364.

A. Loui et al., "Video Combining for Multipoint Videoconferencing," Proceedings of IS&T Annual Conference, May 7, 1995, XP000791951, pp. 48-50.

* cited by examiner

FIG. 5

501 1st IMAGE CODED DATA
502 1st IMAGE DECODED DATA
503 1st IMAGE REENCODED DATA
506 2nd IMAGE REENCODED DATA
505 2nd IMAGE DECODED DATA
504 2nd IMAGE CODED DATA

SWITCHING REQUESTED AND EXECUTED

METHOD, APPARATUS, SYSTEM, AND PROGRAM FOR SWITCHING IMAGE CODED DATA

FIELD OF THE INVENTION

The present invention relates to an image conversion method, an image conversion apparatus, and an image conversion program for converting image coded data so that, when a plurality of networked clients using different specifications carry out communication among themselves to have a conference where image data is used, the clients can exchange information using their supported coding systems and coding settings; for allowing a client with a limited number of displayable images to instantly switch other conference participant's images any time the client wants; and for combining and re-encoding several images from image data of the connected clients into a composite image for transmission.

BACKGROUND OF THE INVENTION

Recently, a bidirectional communication system and a conference system where image- and audio-coded data are communicated via packets over the Internet rapidly become popular. Those systems are built around the technology called VoIP (Voice over IP) and TVoIP (TV over IP). There are several types of coding systems used for those communication systems. For example, the method of transmitting coded data, compressed by a high-efficiency compression method based on inter-frame prediction coding, is used for the moving-image coding system in many cases. In those coding systems, prediction parameters and prediction residual image data, obtained by predicting coded images from temporally preceding and following frames, are encoded to reduce the information amount of time-correlated moving image data. In addition, prediction residual image data is compressed efficiently through transform coding or quantization to allow it to be transmitted at low transmission bandwidth.

Typical compression coding standards are MPEG (Moving Picture Experts Group)-1, MPEG-2, and MPEG-4. In those compression coding standards, inter-frame prediction through motion compensation is performed for an input image frame in units of fixed-size rectangular areas called macro blocks. The signal data which is compressed by performing two-dimensional discrete cosine transform (DCT) and quantization for the resulting motion vector and prediction residual image data are encoded using variable length coding (VLC).

There are also audio (music) coding standards such as G.722, G.729, AMR-NB (Adaptive Multi Rate/Narrow Band), AMR-WB (Adaptive Multi Rate/Wide Band), MPEG-4 AAC (Advanced Audio Codec). Each of those standards can encode a predetermined amount of sampled data efficiently and transmit high-quality audio data at low transmission bandwidth.

There are many methods for delivering such image- or audio-coded data to a packet-switched IP (Internet Protocol) network. In addition, some third-generation (3GPP; 3rd Generation Partnership Project) mobile phones are used as terminals that support circuit-switched (CS) videophones. A gateway is also available for connecting those cellular phones to TVoIP clients connected to an IP network. In future, it is expected that packets will be transmitted via CS or both cellular phones and wireless base stations, to which cellular phones are connected via wireless channels, will be connected to all-IP networks with the result that IP networks and cellular phones will be connected more easily.

[Non-Patent Document 1]
Handley, M., Schulzrinne, H., Schooler, E., Rosenberg, J., "SIP: Session Initiation Protocol", RFC 2543, March 1999, Internet URL <http://www.ietf.org/rfc/rfc2543.txt obtained at http://www.ietf.org/>

[Non-Patent Document 2]
Handley, M., Jacobson, V., "SDP: Session Description Protocol", RFC 2327, April 1998, Internet URL <http://www.ietf.org/rfc/rfc2327.txt obtained at http://www.ietf.org/>

[Non-Patent Document 3]
Schulzrinne, H., Casner, S., Frederick, R., Jacobson, V., "RTP: A Transport Protocol for Real-Time Applications", RFC 1889, January 1996 Internet URL http://www.ietf.org/rfc/rfc1889.txt obtained at http://www.ietf.org/

SUMMARY OF THE DISCLOSURE

However, in a service such as a conventional TV conference system where a plurality of clients are connected, images cannot be transferred among them if the supported coding systems, coding settings, or coding options supported are different. Therefore, in many cases, a conference system is built only among clients of similar types.

Another problem is that, when the number of images that can be displayed is limited by the size of a display, the conference server or the coding data conversion server must switch the videos to be viewed by the user. However, if the videos are switched at a user-desired time but not corresponding to the boundary of a GOP (Group Of Pictures) the is a unit of processing of inter-frame prediction coding, the frame used for prediction is switched and the image remains distorted until the next intraframe-coded data arrives. Therefore, the user cannot switch the image to be viewed always at a user-desired time.

To solve this problem, the number of intraframe-coded frames can be increased to shorten the switching wait time. However, an increase in the number of frames coded by intraframe-coding, which is fundamentally low efficiency coding, decreases the coding efficiency and degrades the image quality.

In view of the foregoing, it is an object of the present invention to provide a method, a device, a system, and a program, for use in a system where a plurality of clients exchange coded data among themselves in a conference where images are used, for converting the coded data of a participating client at the other end of communication according to the coding system, coding setting, and coding option of that client.

It is still another object of the present invention to provide a method, a device, a system, and a program for selecting at least one image desired by a user of a client, on which only a limited number of images can be displayed, from the images of a plurality of other clients in communication and for displaying the selected image on the client.

It is still another object of the present invention to provide a method, a device, a system, and a program for switching an image at a user-desired time quickly and without distortion when the current display image is switched to another image on a client on which only a limited number of images can be displayed.

It is still another object of the present invention to provide a method, a device, a system, and a program for combining the image data from a user-desired plurality of clients and outputting one composite image on a client on which only a limited number of images can be displayed.

It is still another object of the present invention to provide a method, a device, a system, and a program for allowing a client, which exchanges image data via an unstable transmission line such as a wireless transmission line, to carry out reliable-quality image communication.

A method according to one aspect of the present invention that solves at least one of the problems described above comprises at least one step of receiving M items of image coded data wherein M is an integer equal to or larger than 2;

a step of decoding at least one of the received M items of image coded data;

at least one step of re-encoding the decoded data with at least one of
(a) a coding system
(b) a coding bit rate
(c) an image size
(d) a frame rate
(e) a profile
(f) a level
(g) a coding option
(h) a video packet size
(i) a coding frame type configuration
(j) an intraframe interval and
(k) a number of intra macro blocks
changed from the received image coded data;

at least one step of outputting the re-encoded coded data; and a step of switching, in response to a request from an external source, at least one piece of coded data to be output.

A device according to another aspect of the present invention, wherein M is an integer equal to or larger than 2 and N is an integer equal to or larger than 1, comprises a unit for receiving M items of image coded data;

M units for decoding the received M items of image coded data;

N units for re-encoding the decoded M pieces of data, or converting the coded data, with at least one of
(a) a coding system
(b) a coding bit rate
(c) an image size
(d) a frame rate
(e) a profile
(f) a level
(g) a coding option
(h) a video packet size
(i) a coding frame type configuration
(j) an intraframe interval and
(k) a number of intra macro blocks
changed from the received coded data; and N units for outputting the re-encoded coded data. In addition, the device may further comprise a unit for combining a plurality of decoded coded-data for creating one image; and a unit for switching at least one output image to some other input image. N pieces of coded data generated by converting M items of image coded data are output.

A computer program according to a still another aspect of the present invention is a program causing a computer, which constitutes a device for switching image coded data, to:

receive M (where M is an integer equal to or larger than 2) items of image coded data;

decode at least one of the received M items of image coded data;

re-encode the decoded data with at least one of
(a) a coding system
(b) a coding bit rate
(c) an image size
(d) a frame rate
(e) a profile
(f) a level
(g) a coding option
(h) a video packet size
(i) a coding frame type configuration
(j) an intraframe interval and
(k) a number of intra macro blocks
changed from the received image coded data;

output the re-encoded image coded data; and switch, in response to a request from an external source, at least one piece of coded data to be output.

A server according to still another aspect of the present invention is a conversion server connected to a plurality of clients via a transmission line. The conversion server comprises means for receiving image coded data from the clients; means for converting the image-coding system of the received image coded data and sending the converted data, wherein the image-coding system is converted in accordance with at least one of a coding system available for a client, a coding setting, a coding option, and a status of the transmission line; and means for decoding a plurality items of image coded data selected from the image coded data, re-encoding the plurality items of image coded data into one image, and sending the re-encoded data to a client on which a limited number of images can be displayed. The conversion server according to the present invention may further comprise decoding processing units, one or each connected client, for decoding the image coded data received from the clients; and means for perform intraframe-encoding of the decoded image data of an image and sending the intraframe-coded data in response to a display image switching request from the client, wherein the decoded image data is data that will be used after the switching.

The meritorious effects of the present invention are summarized as follows.

As described above, in a service such as a conference in which a plurality of bidirectional communication clients that use images participate, the image switching apparatus according to the present invention allows the clients to exchange data even when the coding system, the coding setting, and the coding option supported by the clients differ among them.

For a client on which the number of images that can be displayed is limited, the image switching apparatus according to the present invention can select at least one image, desired by a user of the client, from the images of a plurality of other clients in communication, and display the selected image on the client.

When a client on which the number of images that can be displayed is limited switches from one display image to some other image, the image switching apparatus according to the present invention can quickly switch from the current display image to some other image any time a user wants with no distortion in the image.

For a client on which the number of images that can be displayed is limited, the image switching apparatus according to the present invention can combine image data from a plurality of user-desired clients and display one image.

The image switching apparatus according to the present invention allows a client, which transfers image data via an unstable transmission line such as a wireless transmission line, to perform communication using stable-quality images.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 5 is a diagram showing how an image is switched in one embodiment of the present invention.

PREFERRED EMBODIMENTS OF THE INVENTION

A preferred embodiment of the present invention will be described. An image switching system in a first embodiment of the present invention for switching image coded data wherein M is an integer equal to or larger than 2 and N is an integer equal to or larger than 1 comprises a unit for receiving M items of image coded data;
M units for decoding the received coded data;
N units for re-encoding the M pieces of decoded data with at least one of
 (a) a coding system
 (b) a coding bit rate
 (c) an image size
 (d) a frame rate
 (e) a profile
 (f) a level
 (g) a coding option
 (h) a video packet size
 (i) a coding frame type configuration
 (j) an intraframe interval and
 (k) a number of intra macro blocks
changed from the received coded data; and
N units for outputting the re-encoded coded data. In addition, the image switching system may further comprise a unit for combining a plurality of decoded coded-data for creating one image; and a unit for switching at least one output image to some other input image. N pieces of coded data generated by converting M items of image coded data are output.

An example of the preferred embodiment will be described as a first embodiment of the present invention with reference to the drawings.

Figure 1:
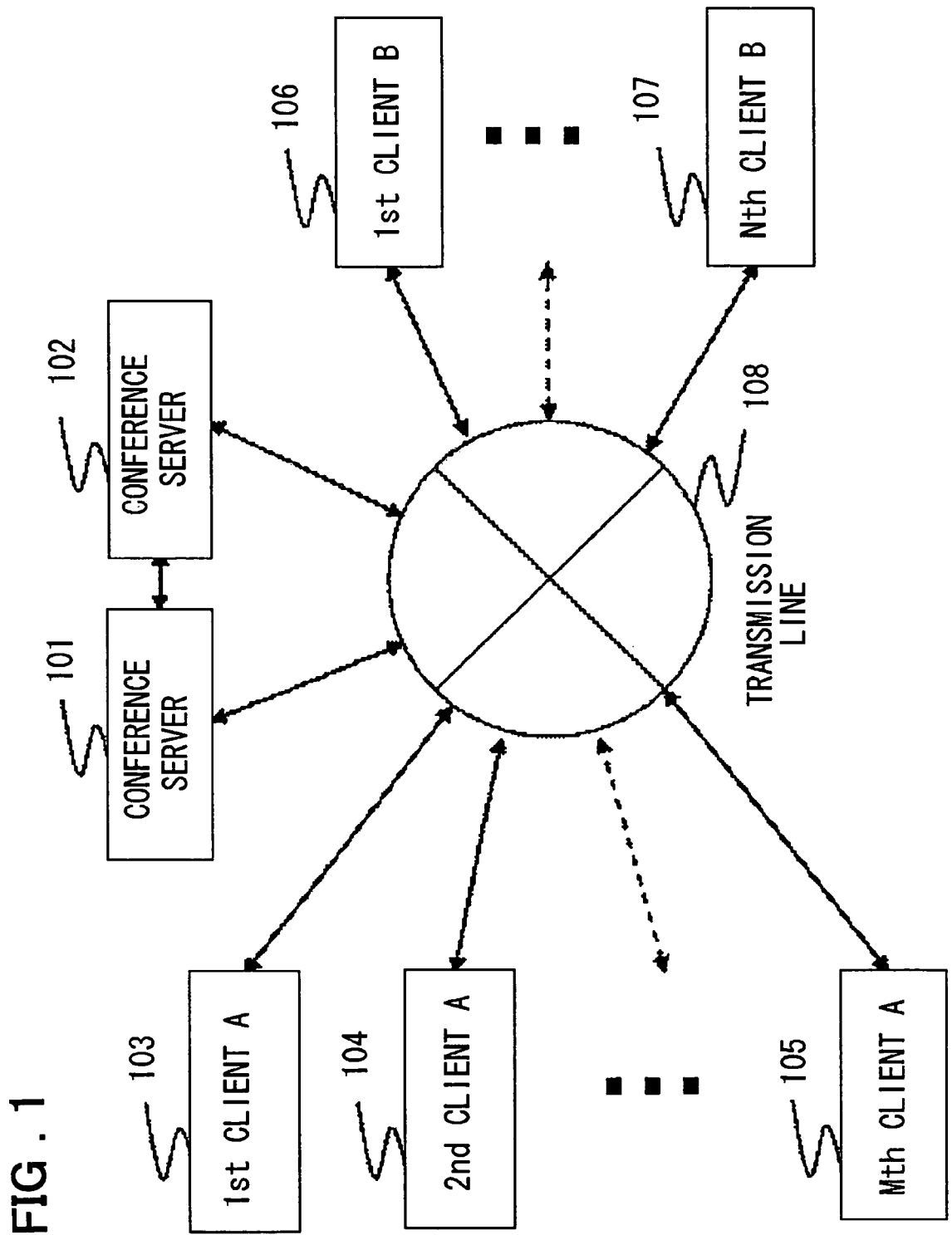
FIG. 1 is a diagram showing the system configuration of a first embodiment of the present invention.

FIG. 1 shows the first embodiment of the present invention. As shown in FIG. 1, a system in this embodiment comprises a conference server, a conversion server, clients A, clients B, and a transmission line. The conference server and the conversion server may be integrated into one server.

In this embodiment, a conference server 101, a conversion server 102, a first client A 103—an Mth client A 105, and a first client B 106—an Nth client B 107 are connected a transmission line 108 that is an IP (Internet Protocol) network. The clients are terminals that send and receive coded data and call connection data via packet switching. The conference server 101 processes SIP (Session Initiation Protocol)/SDP (Session Description Protocol) based call connection data to establish a communication path between a client and the conference server 101.

In this embodiment, assume that client A can decode and display multiple items of image coded data and that client B can decode and display only one item of image coded data. Therefore, client A sends one piece of its image coded data to the conference server 101 and receives multiple pieces of other client's image coded data from the conference server 101.

It is also assumed that client B sends one piece of its image data to the conversion server 102 and selects and receives one piece of other client's image coded data from the conversion server 102.

Client A and client B are of different types, with at least one of the supported coding systems, coding settings, image sizes, and the number of display images different between them. Therefore, coded data can be transferred among clients A or among clients B via conference server 101; however, to transfer image coded data between client A and client B, the conversion server 102 is required to convert coded data supported by one type of client to coded data supported by another.

The conversion server 102 receives image coded data output by the first client A 103—the Mth client A 105, converts the received data to image coded data supported by the first client B 106—the Nth client B 107, and outputs the converted data to the first client B 106—the Nth client B 107.

Similarly, the conversion server 102 receives image coded data output by the first client B 106—the Nth client B 107, converts the received data to image coded data supported by the first client A 103—the Mth client A 105, and outputs the converted data to the first client A 103—the Mth client A 105.

At this time, if the display of client B is so small that only one display screen is available, the conversion server 102 selects one item of image coded data from other participants—clients A or clients B—according to a request from a user of client B and outputs the selected image coded data to that client B.

Alternatively, the conference server 101 may select image data to be output to client B. For example, the conference server 101 may request that the image of the chairman, one of conference participating clients, be sent to client B or that the image of a speaker, one of conference participating clients, be sent to client B.

A conversion server 201 will be described with reference to FIG. 2. The conversion server 201 comprises a connection processing unit 202, a first receiver unit 203—an Mth receiver unit 205, a transcoder 206, a first transmitter/receiver unit 207—an Nth transmitter/receiver unit 208, and a first transmitter unit 209—an Nth transmitter unit 210.

The connection processing unit 202 exchanges call connection information with the conference server, clients A, and clients B, such as session establishment information, client ability information, and so on, via SIP/SDP to obtain information on the clients participating in the conference (For the detailed description of SIP/SDP, see Non-Patent Document 1 and Non-Patent Document 2 given above).

The first receiver unit 203—the Mth receiver unit 205 receive coded data, which is sent respectively from the first client A 103—the Mth client A 105, received by the conference server, and sent to the conversion server 201, based on the session information obtained by the connection processing unit 202 or on the predefined setting. The first transmitter/receiver unit 207—the Nth transmitter/receiver unit 208 receive coded data respectively from the first client B 106—the Nth client B 107.

RTP (Real-Time Transport Protocol)/UDP (User Datagram Protocol)/IP used for data transmission/reception puts the packets in the correct order even if the packets become out of order on the transmission line and, in addition, maintains synchronization between the media when not only image coded data but also non-image medium coded data such as audio data is converted (For the detailed description of RTP, see Non-Patent Document 3 described above).

The transcoder 206 converts coded data received from client A to coded data in accordance with the coding system, coding setting, and coding options supported by client B and outputs the converted coded data, based on information on the coding system, coding setting, and coding options, which is obtained by the connection processing unit 202 to show the ability supported by the clients, or on the preset information.

Conversely, the transcoder 206 receives coded data from client B, converts the received data to coded data in accordance with the coding system, coding setting, and coding options supported by client A, and then outputs the converted coded data.

The coding system means a coding system name such as MPEG-4, H.263, and H264, and a level and a profile.

The coding setting means the following:
Bit rate
Image size (resolution)
Frame rate
Intraframe interval
The coding option means the following:
Presence of resynchronization marker
Video packet size
Whether data partitioning is used
Whether RLVC (Reversible LVC) is used
Presence of HEC (Header Extension Code)
Presence of stuffing code The coded data produced by converting in accordance with client B is sent from the first transmitter/receiver unit 207—the Nth transmitter/receiver unit 208 to the first client B 106—the Nth client B 107. Similarly, the coded data converted in accordance with client A is sent from the first transmitter unit 209—the Nth transmitter unit 210 to the conference server 101.

Figure 2:
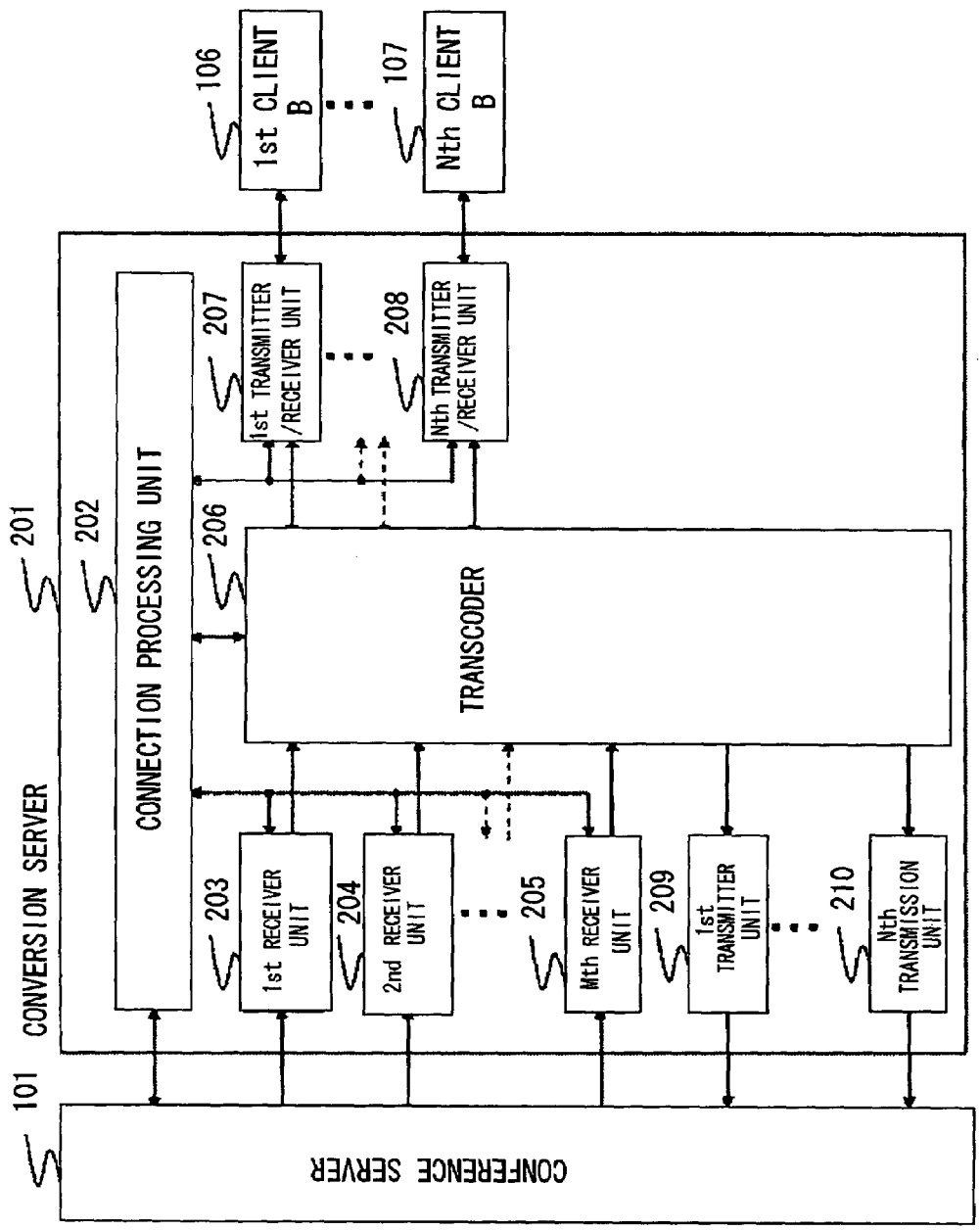
FIG. 2 is a diagram showing the configuration of a conversion server in one embodiment of the present invention.

Referring to FIG. 2, the first receiver unit 203—the Mth receiver unit 205 and the first transmitter unit 209—the Nth transmitter unit 210 each use an independent session with the conference server 101. Instead of this, the number of receiving sessions may be one or less than M and the number of sending sessions may be one or less than N.

In this case, multiple pieces of coded data received from a reception session must be demultiplexed before being passed to the transcoder 206, and multiple pieces of coded data converted by the transcoder 206 must be multiplexed before being passed to a sending session.

For multiplexing/demultiplexing, the payload type, SSRC (Synchronization Source identifier), or CSRC (Contributing Source identifier) included in the RTP header can be used to identify coded data. When received data is identified by those identifiers, the identifier is described for each data received via SDP to notify the information on the coded data to the other end of communication.

Figure 3:
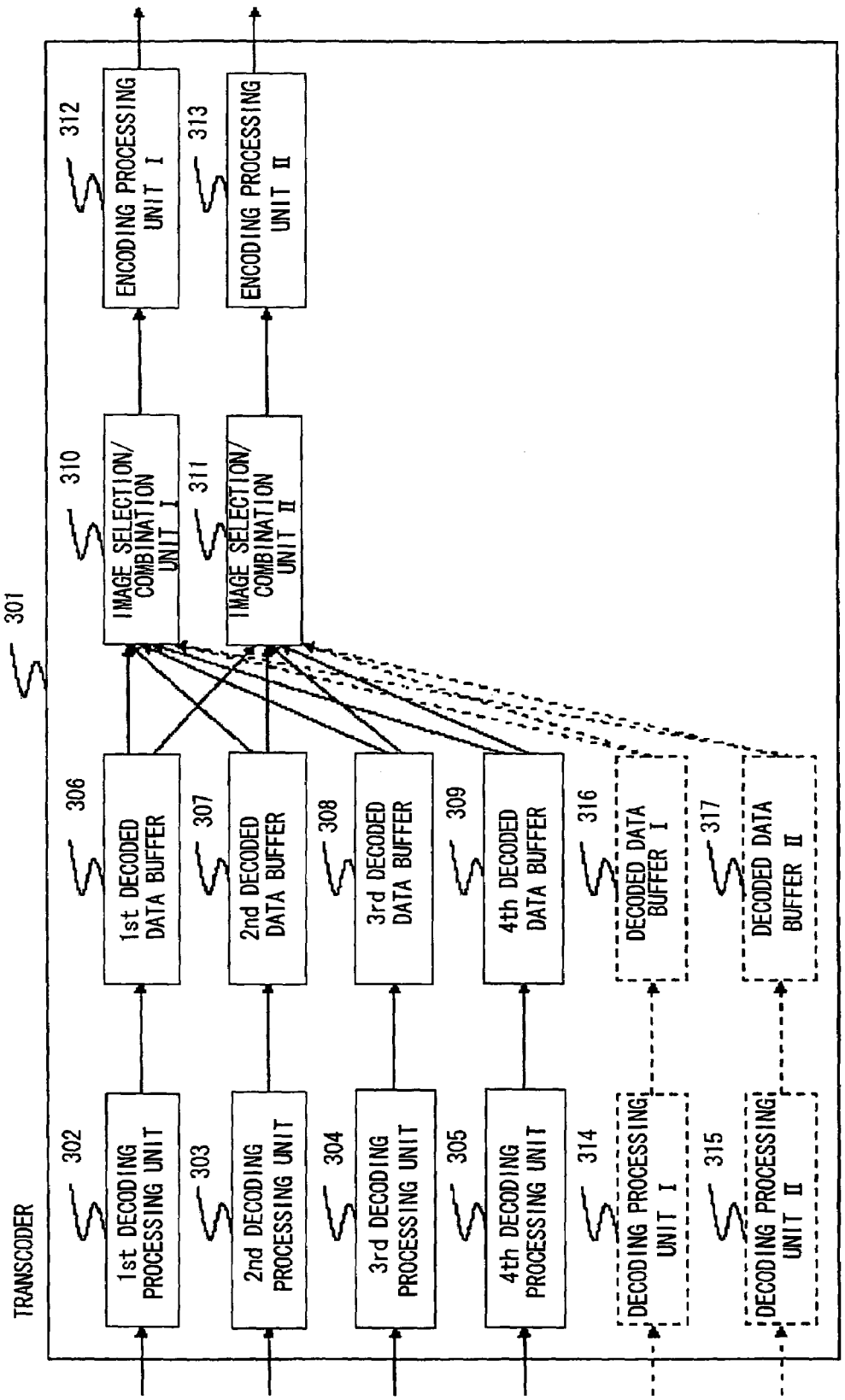
FIG. 3 is a diagram showing the configuration of a transcoder in one embodiment of the present invention.

The following describes the operation of the transcoder in detail with reference to FIG. 3. For the convenience of the description, M is assumed to be 4 and N is assumed to be 2. Of course, M and N are not limited to those values. The following describes only one-way processing in which the transcoder receives coded data from one type of client (client A in this example), converts the received coded data in accordance with the coding system supported by the other client (client B in this example), and outputs the converted data. The transcoder also performs the same processing for conversion as necessary in the reverse direction.

As shown in FIG. 3, a transcoder 301 has a first decoding processing unit 302—a fourth decoding processing unit 305, each corresponding to a respective receiver unit, to decode received coded data.

The decoded image data is sent to first-fourth decoded data buffers, respectively. Although the decoded image data is YUV-format data in this description, the description applies also to RGB.

An image selection/combination unit I 310 and an image selection/combination unit II 311 read decoded image data from one of a first decoded data buffer 306—a fourth decoded data buffer 309 and output processed data to a encoding processing unit I 312 and a encoding processing unit II 313. Which decoded image data is to be selected can be determined according to the request of a coded-data output client notified by the connection processing unit or can be determined in advance. Each of clients may have call connection means for connecting a call between the conference server 101 (FIG. 1) and sends an image switching request via the call connection means to the conference server 101. The conference server 101, on receipt of the image switching request from the client, sends the image switching request to the connection processing unit 202 of the conversion server 102 (FIG. 2), which then informs the image selection/combination unit I 310 and the image selection/combination unit II 311 (FIG. 3) in the transcoder of the image switching request from the client.

The encoding processing unit I 312 and the encoding processing unit II 313 re-encode the selected decoded image data according to the coding system, the coding setting, and the coding option supported by client B, and outputs the re-encoded data.

If client B is connected to a session via an unstable transmission line such as a wireless transmission line, the intraframe interval can be shortened, the video packet size can be reduced, or the number of intra-macro blocks included in an inter-frame can be increased during coding to ensure the communication of image data that is stable against an error or a loss on the transmission line.

In addition, the image selection/combination unit I 310—the image selection/combination unit II 311 may combine a plurality of decoded images according to the client's request or according to the setting determined in advance and output a composite image.

In this embodiment, the decoded images buffered in the first decoded data buffer 306—the fourth decoded data buffer 309 can each be reduced by ¼ and the four images can be output to the encoding processing unit as one image composed of four equal sections. This method allows even client B, which can display only one image because of the limitation in the number of display images, to confirm all four images at the same time.

To include an image from some other client B or the client B itself, on which the image is displayed, into the four combined images displayed on client B, the image selection/combination unit 310 or 311 reads the image data of the client B from decoded data buffer I 316 or decoded data buffer II 317 in which the image data of the client B decoded by decoding processing unit I 314 or decoding processing unit II 315 is stored, and performs the same processing. If the image displayed on client B does not include an image from some other client B or the client B itself on which the image is displayed, those components (decoding processing units I and II, 314 and 315, and decoded data buffers I and II, 316 and 317) are not necessary.

If the number of received image coded data is larger than 4 (M>4), any four images may be selected from the received image coded data according to a request from client B, predetermined images may be selected and combined for each client, or four or more images may be combined into one image.

Next, with reference to the drawings, the following describes how the image selection/combination unit I 310 and the image selection/combination unit II 311 switch a selected image.

Figure 4:
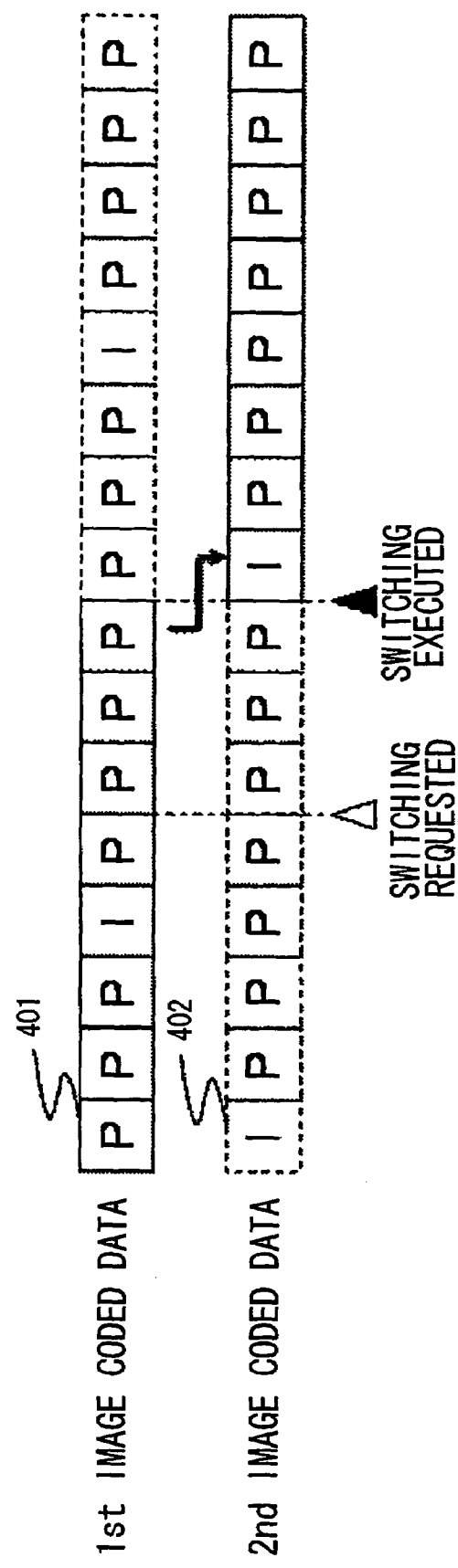
FIG. 4 is a diagram showing how image coded data is switched.

Conventionally, when one image coded data is switched to another, there has been a time difference between the moment a switching request is issued and the moment the image coded data is actually switched, as shown in FIG. 4. The symbol I in the figure indicates an intraframe, that is, an I picture, and the symbol P indicates a P (Predictive) picture. This is because, when first image coded data 401 is switched to second image coded data 402, the data must be switched at the start of intra (I) frame coded data to correctly decode the subsequent frames that are encoded based on prediction.

For coded data where the intraframe interval is long in order to increase coding efficiency, there is the possibility that the time difference between the moment a switching request is issued and the moment the coded data is switched becomes long. In fact, when coded data is switched to coded data where intraframe-coded data appears only at its start, a distortion is always generated in the image at the switching time.

In contrast, according to the present invention, received image coded data that is once decoded and then re-encoded before being switched can be intraframe-coded when the image is switched. Therefore, an image can be switched in the shortest time when a switching request is received.

As shown in FIG. 5, first image coded data 501 and second image coded data 504 are decoded into first image decoded data 502 and second image decoded data 505, respectively.

In FIG. 5, the frames indicated by symbols I and P indicate an I picture and a P picture, respectively, as in FIG. 4. The image decoded data is re-encoded into first image re-encoded data 503 and second image re-encoded data 506, respectively, based on the image coding system, the image coding setting, and the image coding option supported by a client to which the re-encoded image data is output.

In response to a request to switch from the first image re-encoded data 503 to the second image re-encoded data 506, the second image re-encoded data 506 to be used after the switching is intraframe-encoded upon receiving the request when re-encoded from the second image decoded data 505. Thus, this method can decode the predictive code of the subsequent frames correctly with no distortion in the image even when the first image re-encoded data 503 is instantly switched to the second image re-encoded data 506.

In case when a client can decode image coded data without converting the image coded data that has been used before the switching, the first image coded data 501 need neither be decoded nor re-encoded.

Figure 6:
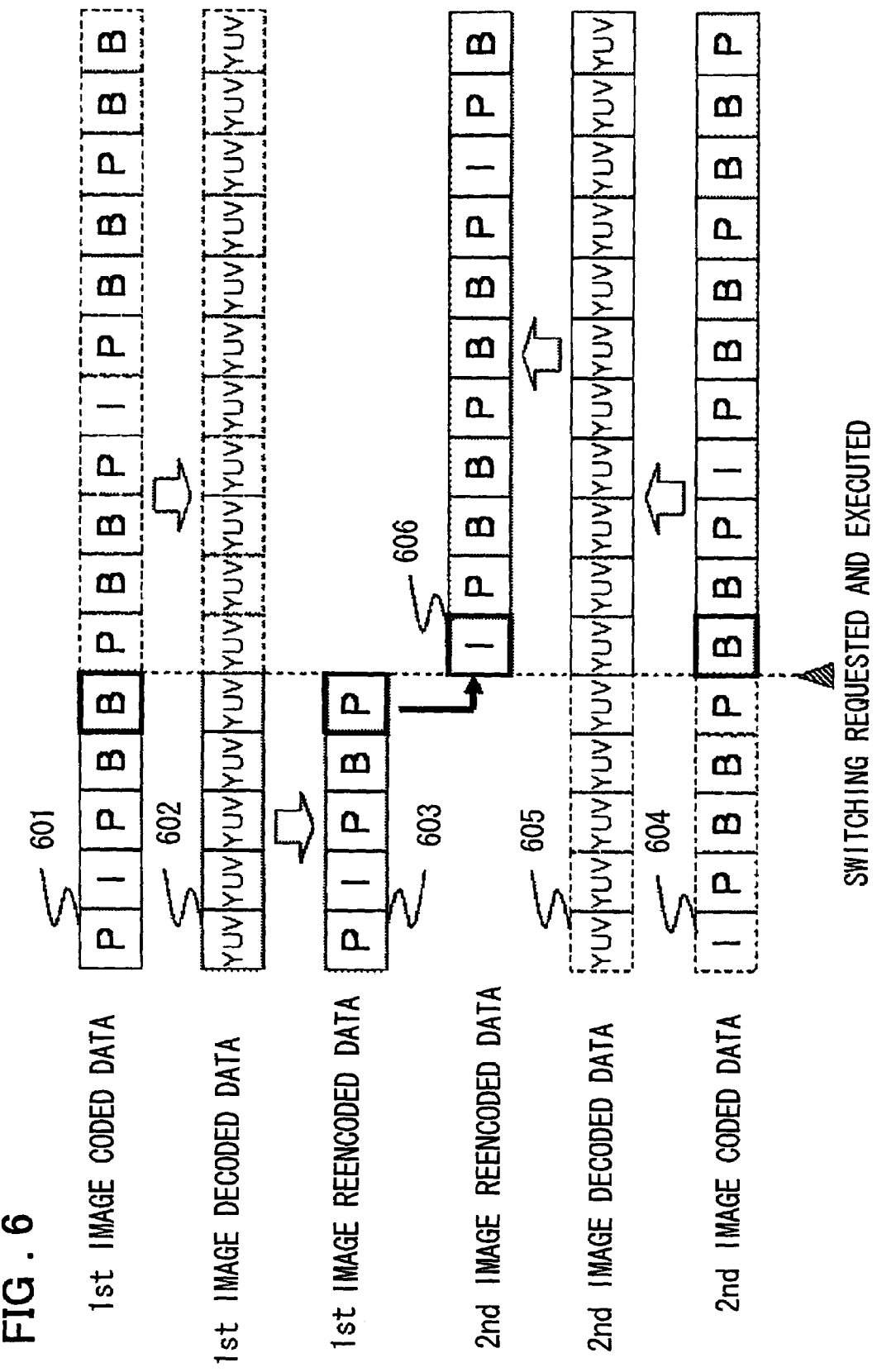
FIG. 6 is a diagram showing how another image is switched in one embodiment of the present invention.

In addition, when image coded data including not only I pictures and P pictures but also B (Bi-directionally predictive) pictures for predicting in two directions is switched as shown in FIG. 6, the frame type is changed also when the image coded data that has been used before the switching is re-encoded.

First image coded data 601 and second image coded data 604 are decoded into first image decoded data 602 and second image decoded data 605, respectively. The image decoded data is then re-encoded into first image re-encoded data 603 and second image re-encoded data 606 based on the image coding system, the image coding setting, and the image coding option supported by a client to which the re-encoded image data is output.

In response to a request to switch from the first image re-encoded data 603 to the second image re-encoded data 606, the second image re-encoded data 606 to be used after the switching is intraframe-encoded upon receiving the request when re-encoded from the second image decoded data 605. At the same time, when the first image re-encoded data 603 that has been used before the switching is re-encoded from the first image decoded data 602, the decoded data is re-encoded so that the frame generated immediately before the request is always a P picture. Thus, this method correctly decodes the last B picture when the first image re-encoded data 603 is switched with no distortion in the image during switching.

Figure 7:
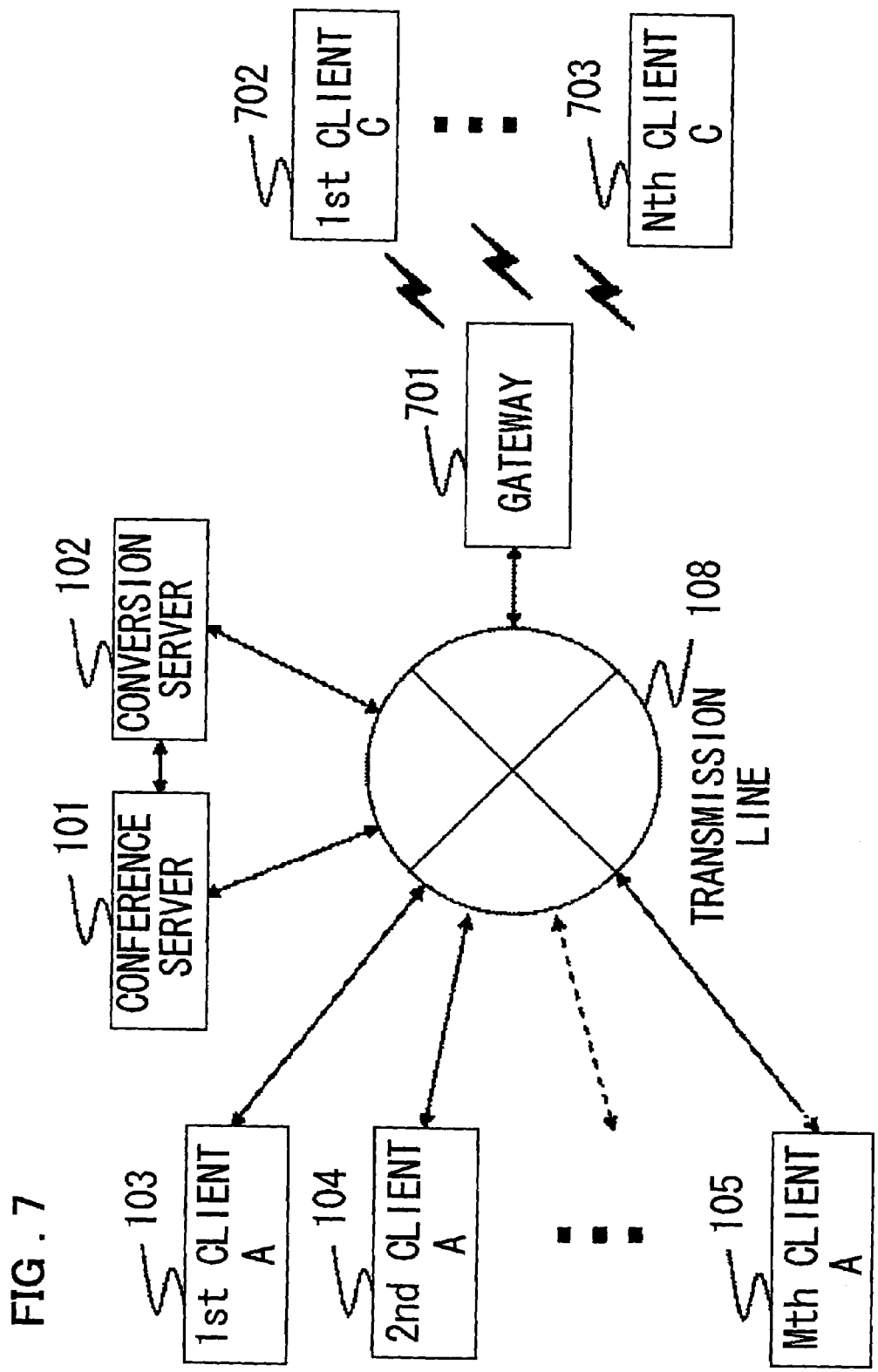
FIG. 7 is a diagram showing the system configuration of another embodiment of the present invention.

For the conference service via an unstable transmission line such as a wireless transmission line described above, not only a client using a wireless LAN (Local Area Network) conforming to IEEE802.11a/b/g but also a cellular phone using the circuit switching service in a system configuration such as the one shown in FIG. 7 can also be used.

In the configuration shown in FIG. 7, a gateway 701 converts the protocol between circuit switching and packet switching (for example, demultiplexing of data multiplexed by H.223 or packetizing) and establishes a call (conversion between H.245 message and SIP/SDP). In the following description, assume that a first client C 702—an Nth client C 703 are cellular phones with the TV telephone function. In this case, a conversion server 102 selects and combines images and converts the difference in the coding system (for example, level), coding setting (for example, image size, bit rate, etc.), and coding option to allow client C to participate in the conference.

Figure 8:
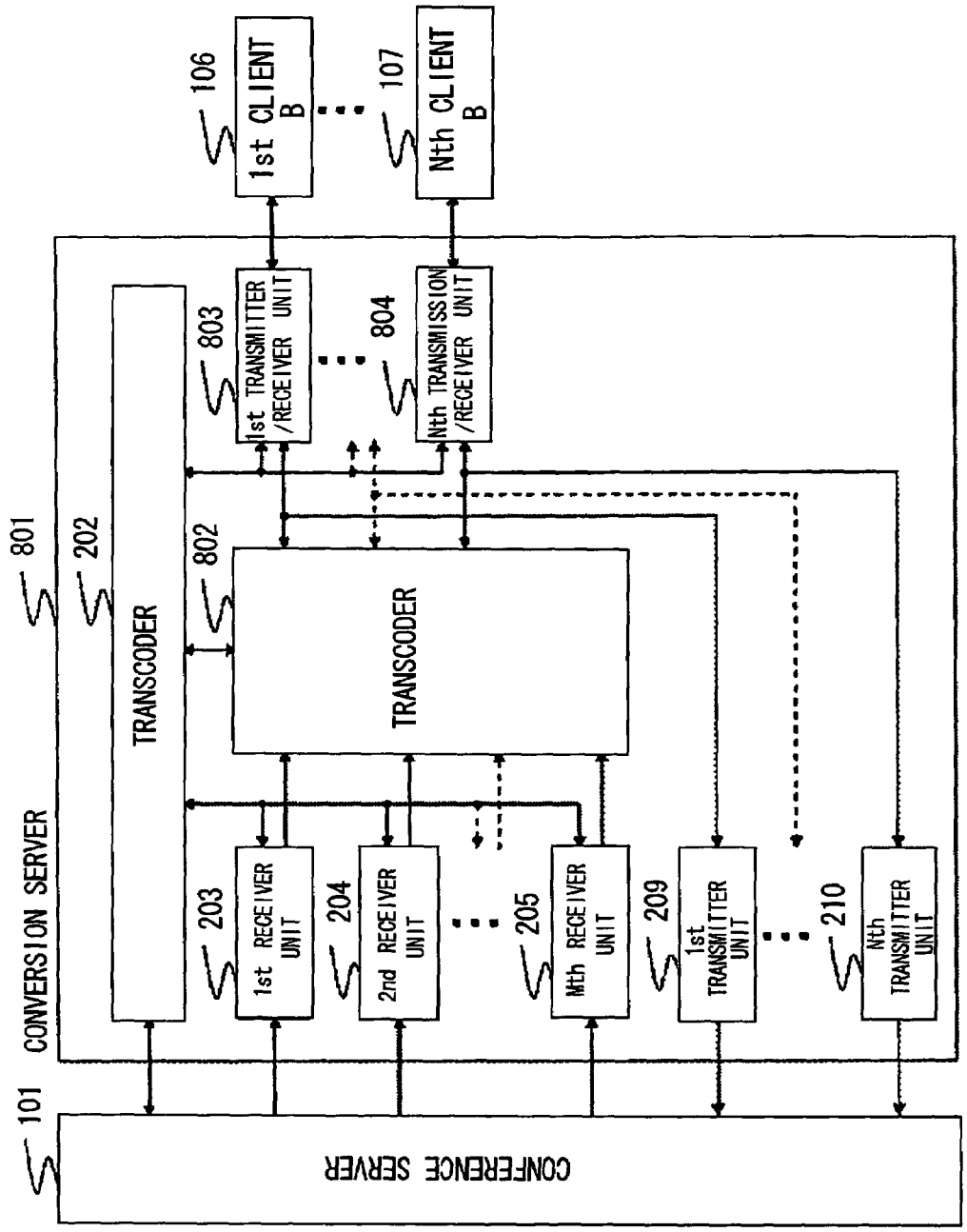
FIG. 8 is a diagram showing the configuration of a conversion server in another embodiment of the present invention.

In this embodiment, if client A can directly decode image coded data output by client B, the conversion in the reverse direction is not necessary. In this case, the conversion server can have a configuration such as the one shown in FIG. 8. That is, a first transmitter/receiver unit 803—an Nth transmitter/receiver unit 804 output coded data, received from a first client B 106—an Nth client B 107, to a transcoder 802 to combine a plurality of images into one image and, at the same time, to a first transmitter unit 209—an Nth transmitter unit 210.

If client B can display one or more images, for example, two images, the same effect can be achieved by providing 2N transmitter/receiver units in FIG. 2 and 2N image selection/combination units and encoding processing units in FIG. 3, that is, by providing as many units as the number of images displayed on client B.

Alternatively, when a plurality of clients B or clients C issue a request to switch to the same image data, the output of the same encoding processing unit in FIG. 3 can be sent to those clients and therefore the amount of coding processing can be reduced. In this case, if the requests from those clients are not issued at the same time, the coding processor can output intraframe-coded data each time a switching request is issued from each client to allow it to quickly switch the image with no disorder in the image.

When a conference is held in a configuration where clients B shown in FIG. 1 and FIG. 2 are added to the configuration shown in FIG. 7 and three types of clients participate in the conference, it is of course possible for the conversion server to perform the same processing to allow the clients to transfer image coded data among themselves.

It is of course possible to execute the function and the processing of the components of the conversion server 201 (that is, the connection processing unit 202, the first receiver unit 203—the Mth receiver unit 205, the transcoder 206, and the first transmitter/receiver unit 207—Nth transmitter/receiver unit 208) under control of the programs stored in the conversion server 201.

As one of variations of the embodiment, at least one of clients may exchange speech data with the conversion server 102 in addition to image data. The conversion server 102 may be adapted to carry out the switching of image coded data responsive to a DTMF (Dual Tone Multi-Frequency) signal received from the client.

Although the present invention has been described with reference to the embodiments given above, the present invention is not limited to the configuration of the embodiments. Of course, the present invention also includes various changes and modification that would be appreciated by those skilled in the art.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An image data switching method wherein M is an integer equal to or larger than 2, said method comprising:
    at least one step of receiving M items of image coded data from a first client;
    a step of decoding at least one of the received M items of image coded data;
    at least one step of re-encoding the decoded data with a server using at least one of:
    (a) a coding system
    (b) a coding bit rate
    (c) an image size
    (d) a frame rate
    (e) a profile
    (f) a level
    (g) a coding option
    (h) a video packet size
    (i) a coding frame type configuration
    (j) an intraframe interval and
    (k) a number of intra macro blocks
    wherein the re-encoding step includes converting the decoded data supported by the first client to re-encoded image data according to coding systems, coding settings and coding options supported by a second client, wherein the second client supports at least one different coding system, coding setting or coding option than the first client;
    at least one step of outputting the re-encoded image coded data to the second client; and
    a step of switching, in response to a request from an external source, at least one item of image coded data to be output.

2. An image data switching method wherein M is an integer equal to or larger than 2 and N is an integer equal to or larger than 1, said method comprising:
    a step of receiving M items of image coded data from a first client;
    M steps of decoding the received M items of image coded data, one step for each item;
    N steps of re-encoding the decoded data with a server using at least one of:
    (a) a coding system
    (b) a coding bit rate
    (c) an image size
    (d) a frame rate
    (e) a profile
    (f) a level
    (g) a coding option
    (h) a video packet size
    (i) a coding frame type configuration
    (j) an intraframe interval and
    (k) a number of intra macro blocks
    wherein the re-encoding step includes converting the decoded data supported by the first client to re-encoded image data according to coding systems, coding settings and coding options supported by a second client, wherein the second client supports at least one different coding system, coding setting or coding option than the first client;
    N steps of outputting the re-encoded image coded data to the second client; and
    a step of switching, in response to a request from an external source, at least one of N items of image coded data to be output.

3. An image switching method wherein M is an integer equal to or larger than 2, said method comprising:
    at least one step of receiving and demultiplexing M items of multiplexed image coded data from a first client;
    a step of decoding at least one of the received M items of image coded data;
    at least one step of re-encoding the decoded data with a server using at least one of:
    (a) a coding system
    (b) a coding bit rate
    (c) an image size
    (d) a frame rate
    (e) a profile
    (t) a level
    (g) a coding option
    (h) a video packet size
    (i) a coding frame type configuration
    (j) an intraframe interval and
    (k) a number of intra macro blocks
    wherein the re-encoding step includes converting the decoded data supported by the first client to re-encoded image data according to coding systems, coding settings and coding options supported by a second client, wherein the second client supports at least one different coding system, coding setting or coding option than the first client;
    at least one step of multiplexing and outputting the re-encoded image coded data to the second client; and
    a step of switching, in response to a request from an external source, at least one item of image coded data to be output.

4. An image switching method wherein M is an integer equal to or larger than 2 and N is an integer equal to or larger than 1, said method comprising:

at least one step of receiving and demultiplexing M items of multiplexed image coded data from a first client;

M steps of decoding the received M items of image coded data, one step for each item;

N steps of re-encoding the decoded data with a sewer using at least one of:
(a) a coding system
(b) a coding bit rate
(c) an image size
(d) a frame rate
(e) a profile
(f) a level
(g) a coding option
(h) a video packet size
(i) a coding frame type configuration
(j) an intraframe interval and
(k) a number of intra macro blocks
wherein the re-encoding step includes converting the decoded data supported by the first client to re-encoded image data according to coding systems, coding settings and coding options supported by a second client, wherein the second client supports at least one different coding system, coding setting or coding option than the first client;

at least one step of multiplexing and outputting the N items of the re-encoded image coded data to the second client; and a step of switching, in response to a request from an external source, at least one item of N image coded data to be output.

5. The image switching method according to claim 1, wherein, when the decoded data is re-encoded, a plurality of said M items of image coded data are decoded and two or more of the decoded images are combined to generate and re-encode one or more but less than M images.

6. The image switching method according to claim 1, wherein, when the decoded data is re-encoded, at least one of
(a) a reduction in the intraframe interval
(b) a reduction in the video packet size, and
(c) an increase in the number of intra macro blocks is performed.

7. The image switching method according to claim 1, wherein, in response to a request from a client sending and receiving the image coded data, at least one of said M items of image coded data is selected and, after said change is applied, output to clients at the other end of communication.

8. The image switching method according to claim 7, wherein, in response to a request from the client, at least one of images received by the client is switched to some other image of the M items of image coded data.

9. The image switching method according to claim 1, wherein, in response to a request from a conference server that relays the image coded data, at least one image of said M items of image coded data is selected and, after said change is applied, output to clients participating in a conference.

10. The image switching method according to claim 1, wherein, in response to a request from a conference server, at least one of images received by a client participating in a conference is switched to some other image of said M items of image coded data.

11. The image switching method according to claim 8 wherein, when the image coded data is switched in response to the request, the decoded-image data of an image to be used after the switching is intraframe-encoded before the switching and then the image is switched.

12. The image switching method according to claim 8 wherein, when the image coded data is switched in response to the request, the decoded-image data of an image that has been used before the switching is encoded using a predetermined frame type and then the image is switched.

13. An image switching apparatus for switching image coded data, comprising:
at least one unit for receiving M (where M is an integer equal to or larger than 2) items of image coded data from a first client;

a unit for decoding at least one of the received M items of image coded data;

at least unit for re-encoding the decoded data with at least one of:
(a) a coding system
(b) a coding bit rate
(c) an image size
(d) a frame rate
(e) a profile
(f) a level
(g) a coding option
(h) a video packet size
(i) a coding frame type configuration
(j) an intraframe interval and
(k) a number of intra macro blocks
wherein the re-encoding step includes converting the decoded data supported by the first client to re-encoded image data according to coding systems, coding settings and coding options supported by a second client, wherein the second client supports at least one different coding system, coding setting or coding option than the first client;

at least one unit for outputting the re-encoded image coded data to the second client; and a unit for switching, in response to a request from a source external to the device, at least one item of image coded data to be output.

14. An image switching apparatus for switching image coded data, comprising:
a unit for receiving M (where M is an integer equal to or larger than 2) items of image coded data from a first client;

M units for decoding the received M items of image coded data, one unit for each item;

N (where N is an integer equal to or larger than 1) units for re-encoding the decoded data with at least one of:
(a) a coding system
(b) a coding bit rate
(c) an image size
(d) a frame rate
(e) a profile
(f) a level
(g) a coding option
(h) a video packet size
(i) a coding frame type configuration
(j) an intraframe interval and
(k) a number of intra macro blocks
wherein the re-encoding step includes converting the decoded data supported by the first client to re-encoded image data according to coding systems, coding settings and coding options supported by a second client, wherein the second client supports at least one different coding system, coding setting or coding option than the first client;

N units for outputting the N items of the re-encoded image coded data, one unit for each item to the second client; and a unit for switching, in response to a request from a source external to the apparatus, at least one of N items of image coded data to be output.

15. An image switching apparatus for switching image coded data, comprising:
- at least one unit for receiving and demultiplexing M (where M is an integer equal to or larger than 2) items of multiplexed image coded data from a first client;
- a unit for decoding at least one of the received M items of image coded data;
- at least one unit for re-encoding the decoded data with at least one of
  - (a) a coding system
  - (b) a coding bit rate
  - (c) an image size
  - (d) a frame rate
  - (e) a profile
  - (f) a level
  - (g) a coding option
  - (h) a video packet size
  - (i) a coding frame type configuration
  - (j) an intraframe interval and
  - (k) a number of intra macro blocks
- wherein the re-encoding step includes converting the decoded data supported by the first client to re-encoded image data according to coding systems, coding settings and coding options supported by a second client, wherein the second client supports at least one different coding system, coding setting or coding option than the first client;
- at least one unit for multiplexing and outputting the re-encoded image coded data to the second client; and
- a unit for switching, in response to a request from a source external to the apparatus, at least one item of image coded data to be output.

16. An image switching apparatus for switching image coded data, comprising:
- at least one unit for receiving and demultiplexing M (where M is an integer equal to or larger than 2) items of multiplexed image coded data from a first client;
- M units for decoding the received M items of image coded data, one unit for each item;
- N (where N is an integer equal to or larger than 1) units for re-encoding the decoded data with at least one of
  - (a) a coding system
  - (b) a coding bit rate
  - (c) an image size
  - (d) a frame rate
  - (e) a profile
  - (f) a level
  - (g) a coding option
  - (h) a video packet size
  - (i) a coding frame type configuration
  - (j) an intraframe interval and
  - (k) a number of intra macro blocks
- wherein the re-encoding step includes converting the decoded data supported by the first client to re-encoded image data according to coding systems, coding settings and coding options supported by a second client, wherein the second client supports at least one different coding system, coding setting or coding option than the first client;
- at least one unit for multiplexing and outputting the N items of the re-encoded image coded data to the second client; and
- a unit for switching, in response to a request from a source external to the apparatus, at least one item of N image coded data to be output.

17. The image switching apparatus according to claim 13, wherein, when the decoded data is re-encoded, said unit for re-encoding decodes a plurality of said M items of image coded data and
combines two or more of the decoded images to generate and re-encode one or more bat less than M images.

18. The image switching apparatus according to claim 13, wherein, when the decoded data is re-encoded, said unit for re-encoding performs at least one of
  - (a) a reduction in the intraframe interval
  - (b) a reduction in the video packet size, and
  - (c) an increase in the number of intra macro blocks.

19. The image switching apparatus according to claim 13, wherein, in response to a request from a client sending and receiving the image coded data, at least one of said M items of image coded data is selected and, after said change is applied, output to clients at the other end of communication.

20. The image switching apparatus according to claim 19, wherein, in response to a request from the client, at least one of images received by the client is switched to some other image of the M items of image coded data.

21. The image switching apparatus according to claim 13, wherein, in response to a request from a conference server that relays the image coded data, at least one image of said M items of image coded data is selected and, after said change is applied, output to clients participating in a conference.

22. The image switching apparatus according to claim 13, wherein, in response to a request from a conference server, at least one of images received by a client participating in a conference is switched to some other image of said M items of image coded data.

23. The image switching apparatus according to claim 20, wherein, when the image coded data is switched in response to the request, the decoded-image data of an image to be used after the switching is intraframe-encoded and then the image is switched.

24. The image switching apparatus according to claim 20, wherein, when the image coded data is switched in response to the request, the decoded-image data of an image that has been used before the switching is encoded using a predetermined frame type and then the image is switched.

25. A computer program, embodied in a computer readable medium, for causing a computer, which constitutes a device for switching image coded data, to execute the steps of:
- receiving M (where M is an integer equal to or larger than 2) items of image coded data;
- decoding at least one of the received M items of image coded data;
- re-encoding the decoded data with at least one of
  - (a) a coding system
  - (b) a coding bit rate
  - (c) an image size
  - (d) a frame rate
  - (e) a profile
  - (f) a level
  - (g) a coding option
  - (h) a video packet size
  - (i) a coding frame type configuration
  - (j) an intraframe interval and
  - (k) a number of intra macro blocks
- wherein the re-encoding step includes converting the decoded data supported by a first client to re-encoded image data according to coding systems, coding settings and coding options supported by a second client, wherein the second client supports at least one different coding system, coding setting or coding option than the first client;

outputting the re-encoded image coded data; and switch, in response to a request from a source external to the device, at least one item of image coded data to be output.

26. A computer program product, embodied in a computer readable medium, for causing a computer, which constitutes a device for switching image coded data, to execute the steps of:

receiving and demultiplexing M (where M is an integer equal to or larger than 2) items of multiplexed image coded data;

decoding at least one of the received M items of image coded data;

re-encoding the decoded data with at least one of
(a) a coding system
(b) a coding bit rate
(c) an image size
(d) a frame rate
(e) a profile
(f) a level
(g) a coding option
(h) a video packet size
(i) a coding frame type configuration
(j) an intraframe interval and
(k) a number of intra macro blocks wherein the re-encoding step includes converting the decoded data supported by a first client to re-encoded image data according to coding systems, coding settings and coding options supported by a second client, wherein the second client supports at least one different coding system, coding setting or coding option than the first client;

multiplexing and output the re-encoded image coded data; and switching, in response to a request from a source external to the device, at least one item of image coded data to be output.

27. The computer program product, embodied in a computer readable medium, according to claim 25, wherein, when the decoded data is re-encoded, said program causes said computer to decode a plurality of said M items of image coded data and to combine two or more of the decoded images to generate and re-encode one or more but less than M images.

28. The computer program product, embodied in a computer readable medium, according to claim 25, wherein, when the decoded data is re-encoded, said program causes said computer to perform at least one of
(a) a reduction in the intraframe interval
(b) a reduction in the video packet size, and
(c) an increase in the number of intra macro blocks.

29. The computer program product, embodied in a computer readable medium, according to claim 25, wherein, in response to a request from a client sending and receiving the image coded data, said program causes said computer to select at least one image of said M items of image coded data and, after said change is applied, to output the selected data to clients at the other end of communication.

30. The computer program product, embodied in a computer readable medium, according to claim 29, wherein, in response to a request from the client, said program causes said computer to switch at least one of images, received by the client, to some other image of the M items of image coded data.

31. The computer program product, embodied in a computer readable medium, according to claim 25, wherein, in response to a request from a conference server that relays the image coded data, said program causes said computer to select at least one image from said M items of image coded data and, after said change is applied, to output the selected data to clients participating in a conference.

32. The computer program product, embodied in a computer readable medium, according to claim 25, wherein, in response to a request from a conference server, said program causes said computer to switch to at least one of images received by a client participating in a conference to some other image of said M items of image coded data.

33. The computer program product, embodied in a computer readable medium, according to claim 30, wherein, when the image coded data is switched in response to the request, said program causes said computer to perform intraframe-encoding of the decoded-image data of an image, which will be used after the switching, and then to switch the image.

34. The computer program product, embodied in a computer readable medium, according to claim 30, wherein, when the image coded data is switched in response to the request, said program causes said computer to code the decoded-image data of an image, which has been used before the switching, using a predetermined frame type and then to switch the image.

35. An information communication system comprising a plurality of clients and a conversion server, said plurality of clients and said conversion server connected to a transmission line for transmitting at least image coded data, said conversion server comprising:

means for receiving M (where M is an integer equal to or larger than 2) items of image coded data from a first client;

means for decoding at least one of the received M items of image coded data;

means for re-encoding the decoded data with at least one of:
(a) a coding system
(b) a coding bit rate
(c) an image size
(d) a frame rate
(e) a profile
(f) a level
(g) a coding option
(h) a video packet size
(i) a coding frame type configuration
(j) an intraframe interval and
(k) a number of intra macro blocks wherein the re-encoding step includes converting the decoded data supported by the first client to re-encoded image data according to coding systems, coding settings and coding options supported by a second client, wherein the second client supports at least one different coding system, coding setting or coding option than the first client;

means for outputting the re-encoded image coded data to the second client; and means for switching, in response to a request from a source external to said conversion server, at least one item of image coded data to be output.

36. An information communication system comprising a plurality of clients and a conversion server, said plurality of clients and said conversion server connected to a transmission line for transmitting at least image coded data, said conversion server comprising:
means for receiving and demultiplexing M (where M is an integer equal to or larger than 2) items of multiplexed image coded data from a first client;
means for decoding at least one of the received M items of image coded data;
means for re-encoding the decoded data with at least one of:
(a) a coding system
(b) a coding bit rate
(c) an image size
(d) a frame rate
(e) a profile
(f) a level
(g) a coding option
(h) a video packet size
(i) a coding frame type configuration
(j) an intraframe interval and
(k) a number of intra macro blocks
wherein the re-encoding step includes converting the decoded data supported by the first client to re-encoded image data according to coding systems, coding settings and coding options supported by a second client, wherein the second client supports at least one different coding system, coding setting or coding option than the first client;
means for multiplexing and outputting re-encoded image coded data to the second client; and
means for switching, in response to a request from a source external to said conversion server, at least one item of image coded data to be output.

37. The information communication system according to claim 35, wherein said means for re-encoding decodes a plurality of said M items of image coded data and combines two or more of the decoded images to generate and re-encode one or more but less than M images.

38. The information communication system according to claim 35, wherein said means for re-encoding performs at least one of
(a) a reduction in the intraframe interval
(b) a reduction in the video packet size, and
(c) an increase in the number of intra macro blocks.

39. The information communication system according to claim 35, wherein, in response to a request from a client sending and receiving the image coded data, said conversion server further comprises means for selecting at least one of said M items of image coded data and, after said change is applied, outputting the selected data to clients at the other end of communication.

40. The information communication system according to claim 39, wherein, in response to a request from the client, said conversion server further comprises means for switching at least one of images, received by the client, to some other image of the M items of image coded data.

41. The information communication system according to claim 35, further comprising a conference server connected to said transmission line, wherein said conversion server further comprises means for selecting at least one of said M items of image coded data and, after said change is applied, outputting the selected image to clients participating in a conference in response to a request from said conference server that relays the image coded data.

42. The information communication system according to claim 35, further comprising a conference server connected to said transmission line, wherein said conversion server further comprises means for switching at least one of images, received by a client participating in a conference, to some other image of said M items of image coded data in response to a request from said conference server.

43. The information communication system according to claim 40, wherein, for use when the image coded data is switched in response to the request, said conversion server further comprises means for perform intraframe-encoding of the decoded-image data of an image, which will be used after the switching, and then switching the image.

44. The information communication system according to claim 40, wherein, for use when the image coded data is switched in response to the request, said conversion server further comprises means for encoding the decoded-image data of an image, which has been used before the switching, using a predetermined frame type, and then switching the image.

45. A conversion server connected to a plurality of clients via a transmission line, said conversion server comprising:
means for receiving image coded data from the clients;
means for converting an image-coding system of the received image coded data and sending the converted data, said image-coding system being converted in accordance with a status of said transmission line and at least one of a coding system available for a client, a coding setting, a coding option; and
means for decoding a plurality items of image coded data selected from the image coded data, re-encoding the plurality items of image coded data into one image, and sending the re-encoded data to a client on which a limited number of images can be displayed.

46. The conversion server according to claim 45, further comprising:
a plurality of decoding processing units each decoding the image coded data received from a client; and
means for perform intraframe-encoding of the decoded image data of an image and sending the intraframe-coded data in response to a display image switching request from the client, said decoded image data being used after the switching.

47. The conversion server according to claim 46, further comprising means for encoding the decoded image data of an image using a predetermined frame type and switching the image in response to a switching request from the client, said decoded image data being used before the switching.

48. The conversion server according to claim 46, wherein the decoded image data decoded by said plurality of decoding processing units is stored in a plurality of decoded data buffers, said conversion server further comprising
image selection/combination means for selectively reading the decoded image data from one of said plurality of decoding buffers and outputting the decoded image data to a encoding processing unit,
wherein said encoding processing unit re-encodes and outputs the selected decoded image data in accordance with a coding system, a coding setting, and a coding option supported by a client.

49. The conversion server according to claim 48, wherein said image selection/combination unit combines a plurality of decoded images and outputs a composite image according to a client request or a predefined setting.

50. The conversion server according to claim 49, wherein said image selection/combination unit reduces the decoded images, each buffered in one of said plurality (K) of decoded data buffers, by 1/K, arranges the reduced images into one image, and outputs said one image to said encoding processing unit.

51. The conversion server according to claim 48, wherein, when the image data of a client itself or some other client is to be included into an image created by combining a plurality of images displayed on the client that receives the re-encoded output from said encoding processing unit, said image selection/combination unit reads a decoded image from the decoded data buffer, combines the coded images, and outputs a resulting composite image, said decoded data buffer storing therein image data decoded by the decoding processing unit corresponding to said client or some other client.

* * * * *